US012617918B2

(12) United States Patent
Malley et al.

(10) Patent No.: US 12,617,918 B2
(45) Date of Patent: May 5, 2026

(54) OR RELATING TO PLASTIC RECYCLING

(71) Applicant: Reventas Limited, Livingston (GB)

(72) Inventors: Peter Malley, Livingston (GB);
Andrew Burns, Livingston (GB)

(73) Assignee: REVENTAS LIMITED, Livingston (GB)

( * ) Notice: Subject to any disclaimer, the term of this patent is extended or adjusted under 35 U.S.C. 154(b) by 615 days.

(21) Appl. No.: 18/022,280

(22) PCT Filed: Aug. 25, 2021

(86) PCT No.: PCT/EP2021/073535
§ 371 (c)(1),
(2) Date: Feb. 21, 2023

(87) PCT Pub. No.: WO2022/043396
PCT Pub. Date: Mar. 3, 2022

(65) Prior Publication Data
US 2023/0323070 A1 Oct. 12, 2023

(30) Foreign Application Priority Data

Aug. 26, 2020 (GB) ...................................... 2013341
Jun. 25, 2021 (GB) ...................................... 2109182

(51) Int. Cl.
| | |
|---|---|
| *C08J 11/08* | (2006.01) |
| *B01J 19/24* | (2006.01) |
| *B32B 27/08* | (2006.01) |
| *B82Y 30/00* | (2011.01) |

(52) U.S. Cl.
CPC ............. *C08J 11/08* (2013.01); *B01J 19/245* (2013.01); *B32B 27/08* (2013.01); *B82Y 30/00* (2013.01); *C08J 2323/06* (2013.01); *C08J 2323/12* (2013.01); *C08J 2323/16* (2013.01); *C08J 2423/06* (2013.01); *C08J 2423/12* (2013.01)

(58) Field of Classification Search
USPC ......................................................... 521/47
See application file for complete search history.

(56) References Cited

U.S. PATENT DOCUMENTS

| | | | |
|---|---|---|---|
| 4,923,658 A | 5/1990 | Hover et al. | |
| 9,803,035 B2 | 10/2017 | Layman et al. | |
| 2008/0249200 A1 | 10/2008 | Yokoyama et al. | |
| 2014/0272403 A1 | 9/2014 | Chang et al. | |

FOREIGN PATENT DOCUMENTS

| | | | | |
|---|---|---|---|---|
| CN | 101133103 A | 2/2008 | ............. | C08G 85/00 |
| CN | 10666053 A | 5/2017 | ............. | B03B 5/02 |
| CN | 106660053 A | 5/2017 | ............. | B03B 5/02 |
| CN | 206199072 U | 5/2017 | | |
| CN | 107709427 A | 2/2018 | ............. | C08J 11/08 |
| CN | 108890920 A | 11/2018 | | |
| CN | 208911941 U | 5/2019 | | |
| EP | 1484120 A1 | 12/2004 | | |
| EP | 1829914 A1 | 9/2007 | | |
| GB | 644873 A | 10/1950 | ............. | C08F 36/04 |
| GB | 2547899 A | * 9/2017 | ............. | B03B 5/36 |
| JP | S49107070 A | 10/1974 | ............. | B29B 17/02 |
| JP | S5615319 A | 2/1981 | | |
| JP | H06192503 A | 7/1994 | | |
| JP | H07126430 A | 5/1995 | | |
| JP | 2008019306 A | 1/2008 | | |
| JP | 2009515695 A | 4/2009 | ............. | B01F 23/00 |
| JP | 2013141625 A | 7/2013 | ............. | B01F 1/00 |
| KR | 100759479 B1 | 10/2007 | | |
| WO | 8503838 A1 | 8/1985 | | |

OTHER PUBLICATIONS

Intellectual Property Office of The UK Patent Office; Search Report for GB2013341.9; Sep. 8, 2020; one page; Intellectual Property Office of the UK Patent Office, Newport, South Wales, United Kingdom.
Intellectual Property Office of The UK Patent Office; Combined Search and Examination Report for GB2013341.9; Sep. 9, 2020; one page; Intellectual Property Office of the UK Patent Office, Newport, South Wales, United Kingdom.
Intellectual Property Office of The UK Patent Office; Search Report for GB2112191.8; Oct. 25, 2021; one page; Intellectual Property Office of the UK Patent Office, Newport, South Wales, United Kingdom.
Intellectual Property Office of The UK Patent Office; Combined Search and Examination Report for GB2112191.8; Oct. 26, 2021; one page; Intellectual Property Office of the UK Patent Office, Newport, South Wales, United Kingdom.
The International Bureau of WIPO, International Preliminary Report on Patentability for PCT/EP2021/073535; Feb. 28, 2023; six pages; European Patent Office, Rijswijk, The Netherlands.

(Continued)

*Primary Examiner* — Terressa Boykin
(74) *Attorney, Agent, or Firm* — LAW OFFICE OF JESSE D. LAMBERT, LLC

(57) ABSTRACT

A method to purifying reclaimed polymers for improving the grade and consistency in the properties of mixed recycled plastic to increase their use in secondary applications. A desired property of the purified reclaimed polymer is determined with a first parameter value of a reclaimed polymer feedstock also determined to provide the desired property in the purified reclaimed polymer. Ratios of polymer feedstocks with differing parameter values are combined to give the first parameter value. These polymer feedstocks are then dissolved into a solution before the purer polymer with the desired property is separated out. Embodiments of reactor vessels for the dissolution step are described. Polyethylene feedstocks can be used with parameters of density and molecular weight to provide high grade polyethylene with desired physical and mechanical properties such as density, molecular weight, strength, stress, stiffness and impact resistance.

20 Claims, 3 Drawing Sheets

(56)         References Cited

OTHER PUBLICATIONS

Saudi Authority for Intellectual Property; Examination Report for application No. 523442246; May 31, 2025; all pages; Saudi Authority for Intellectual Property, Riyadh, Kingdom of Saudi Arabia.
Chinese National Intellectual Property Administration; First Office Action in CN202180051921.9; Dec. 25, 2025; all pages (1-12 in English translation); Chinese National Intellectual Property Administration; China.

* cited by examiner

OR RELATING TO PLASTIC RECYCLING

The present invention relates to plastic recycling and more particularly, to a method of purifying reclaimed polymers for improving the grade and consistency in the properties of mixed recycled plastic to increase their use in secondary applications.

Recycling of waste materials has now become a major environmental driver. In this regard the recycling of plastics is placed high on the agenda as these are non-biodegradable. Unfortunately, a key stumbling block to the ideal of a closed loop circular economy is recycler's ability to extract value from mixed plastic waste for resale and reuse.

There are many feedstocks that can be used for supplying to a plastic recycling process. Examples of plastic feedstocks are: single source end of life thermoplastics i.e. wheelie bins all colours, containers, pipe, bottle caps, bottles and tanks; post-consumer and post-industrial recycled plastics; mixed PE/PP (polyethylene/polypropylene) recyclate; films i.e. multilayer films, laminate films, PE or PP films; and other mixed thermoplastics such as ABS (acrylonitrile butadiene styrene), Polystyrene, PVC (polyvinyl chloride). Currently recyclers extract value by simply separating the plastics into groups for resale with the vast majority of it being a mixed colour granulate. This colour limits the secondary application for recycled plastics as moulders and manufacturers have no choice in colour selection so any products are grey/black, low value and out of sight. This, combined with additives and contaminants that can be present in recyclate, result in low resale value and recyclers can only extract value from a small percentage of material economically.

Much has been done to remove additives and contaminants to increase the value. U.S. Pat. No. 9,803,035, for example, discloses a method for purifying reclaimed polymers, such as polyethylene reclaimed from post-consumer use or post-industrial use to produce a colourless or clear, odour free, virgin-like polymer. The method involves obtaining the reclaimed polyethylene and contacting it at an elevated temperature and pressure with a fluid solvent to produce an extracted reclaimed polyethylene. The extracted reclaimed polyethylene is dissolved in a solvent at an elevated temperature and pressure to produce a polyethylene solution, which is purified at an elevated temperature and pressure by contacting the polyethylene solution with solid media to produce a purer polyethylene solution. A purer polyethylene is then separated from the purer polyethylene solution. The elevated temperatures are 90° C. to about 220° C. and elevated pressures from about 350 psig (2.41 MPa) to about 20,000 psig (137.90 MPa).

While this process provided a purified polyethylene, which may be sourced from post-consumer waste streams, which is essentially contaminant-free, pigment-free, odour-free and homogenous, it could only be provided with mechanical and physical properties similar to virgin polymers. Such variation in the mechanical and physical properties, for example the density and melt index, of the purified polyethylene limit it's uses in secondary applications where manufacturers are seeking a particular grade of polyethylene in terms of density and molecular weight with specific mechanical properties such as environmental stress resistance, along with strength, stiffness and impact resistance.

It is therefore an object of the present invention to provide a method of purifying reclaimed polymers which obviates or mitigates one or more disadvantages in the prior art.

According to a first aspect of the present invention there is provided a method of purifying reclaimed polymers, comprising the steps:

(a) determining a desired property of the purified reclaimed polymer;

(b) determining a first parameter value of a reclaimed polymer feedstock to provide the desired property in the purified reclaimed polymer;

(c) selecting at least two proportions of reclaimed polymer feedstock with differing parameter values, the percentage of the at least two proportions being equated to produce a combined parameter value equal to the first parameter value;

(d) dissolving the percentages of the at least two proportions of reclaimed polymer feedstock in a solvent to produce a polymer solution; and (e) separating a purer polymer from the polymer solution, the purer polymer being the purified reclaimed polymer with the desired property.

By monitoring the properties of the feedstocks, selecting the ones to be used and then mixing them in a desired ratio the resulting product at the end of the process can be designed to have the specific properties required. This produces a purified reclaimed polymer with a higher number of grades at a higher consistency, which are more useful and thus valuable for secondary applications.

Preferably, the parameters are density and molecular weight. Such parameters are examples most preferable for polyethylene as the reclaimed polymer feedstock. These are selected as they can be determined from reclaimed polymer feedstock. Additionally, by varying the values of these parameters, physical and mechanical properties can be adjusted. Preferably, the desired property is selected from a group comprising but not limited to: density, molecular weight, environmental stress resistance, strength resistance, stiffness resistance and impact resistance.

The method requires the dissolution of the plastic (polymer) in a solvent before the purification steps can take place. The dissolution step provides a much greater degree of intimate mixing than by carrying this out with more conventional means such as melt blending in an extruder and so will allow for a greater number of grades to be produced with a higher consistency. This will be particularly useful in modifying the mol wt (molecular weight) distribution of the plastics produced and hence the final properties.

While the dissolution of polymers in solvents has been practiced for years at a laboratory and small batch scale, it is not suitable as a commercial process due primarily to the length of time it takes to dissolve polymers (hours). While it is known that undertaking the dissolution at elevated temperatures and pressures will allow for some decrease in the time, this is not significantly compensated for by the additional equipment and procedures required to control the pressure and temperature during dissolution on a commercial scale. A further disadvantage is seen in the quantity of solvent required, with a typical minimum polymer solvent ratio being 1:100. This results in small quantities of reclaimed polymer which can be processed at a time which limits the amount of each proportion which can be used to create an ideal mix.

Preferably step (d) comprises the steps:

i. introducing the percentages of the at least two proportions of reclaimed polymer feedstock to at least one solvent in a reactor vessel to create a mixture;

ii. operating a mixing device within the reactor vessel for a first time duration;

characterised in that, the mixing device comprises: a plurality of discs aligned parallel to each other in a stacked arrangement; each disc extending over a majority of the cross-sectional area of the reactor vessel and including a plurality of perforations to allow the mixture to flow from a first end of the reactor vessel to a second end of the reactor vessel, through the discs; one or more supports to hold the discs in position; and the one or more supports connected to a linear motion generator so that the discs are moved to oscillate at a first frequency and first amplitude, the linear motion dissolving at least a portion of polymer in the solvent in the first time duration.

It has been surprisingly discovered that by use of such a mixing device the time duration for dissolution is greatly reduced to minutes rather than hours and that the polymer to solvent ratio can also be increased, while the mixing device advantageously ensures a more consistent polymer solution and hence purified reclaimed polymer.

The reclaimed polymer feedstock may be in the range of 0.1% to 100% wt addition. Preferably, the reclaimed polymer feedstock is in the range of 0.1% to 20% wt addition. More preferably, the reclaimed polymer feedstock is in the range of 0.3% to 10% wt addition. By being able to reduce the polymer solvent ratio to 1:20 or even 1:10, commercial use becomes economical. Reactor vessel volumes of 1,000 litres and greater can be realised.

Preferably the first frequency is in the range 1 to 15 Hz. Preferably the first amplitude is in the range 40 to 1000 mm. Tuning the frequency and amplitude can further reduce the first time duration.

Preferably, the method includes purging an inert gas into the reactor vessel to displace oxygen with an inert atmosphere. Preferably the inert gas is nitrogen.

Preferably, the method includes heating the mixture to a first temperature. Preferably the mixture is heated by heating the reactor vessel. Preferably the temperature is between room temperature and the at least one solvent boiling point. Temperatures in the range of 80° C. to 120° C. may be used. Preferably the temperature is above 120° C. By raising the temperature of the mixture, the first time duration can be reduced. The temperatures required are suitable for commercial application.

Preferably, the method includes operating the reactor vessel at atmospheric pressure (0.1 MPa). This greatly simplifies the equipment required and improves safety. The method may include operating the reactor vessel at up to 5 atm (0.5 MPa). Such a small increase compared to the prior art can be used to further reduce the first time duration.

Preferably, the at least one reclaimed polymer feedstock is one or more polyolefins. This allows the system to work on a thermoplastic feedstock. Preferably, the at least one reclaimed polymer feedstock is polyethylene (PE) and/or polypropylene (PP). More preferably, the at least one reclaimed polymer feedstock is mixed PE/PP recyclate. Such recyclates are a typical product created for use in recycling which contain additives such as colour pigments.

The method may include a first step in which a mixed plastic feedstock is mechanically separated to remove contaminants. The contaminants may be considered as, but not limited to, polyvinyl chloride (PVC), polyethylene terephthalate (PET) and acrylonitrile butadiene styrene (ABS). Examples of plastic feedstocks may be: single source end of life thermoplastics i.e. wheelie bins all colour, containers, pipe, bottle caps, bottles and tanks; post-consumer and post-industrial recycled plastics; mixed PE/PP recyclate; films i.e. multilayer films, laminate films, PE or PP films; and other mixed thermoplastics: ABS, Polystyrene, PVC.

Preferably the at least one solvent is butylal. More preferably one or more solvent is butylal/dibutoxymethane. This has found to be most effective but any solvent which operates on a polymer can be used. Other typical solvents may be xylene, toluene and benzene, for example. The method may include the step of selecting the at least one solvent for the polarity of the polymer as the solute and the solvent. It has been found that this factor affects the solubility of the polymer in the solvent.

Preferably, the plurality of discs are aligned parallel to each other in a vertical stack, with the mixture flowing vertically in the reactor vessel through the discs, and the discs are moved up and down at the first frequency and the first amplitude. In this way, the reactor vessel is vertically arranged. The discs may be considered as lying perpendicular to side walls of the reactor vessel, each on a horizontal plane. Preferably the reactor vessel is cylindrical to provide a cylindrical side wall. More preferably, the one or more supports is a single post aligned perpendicularly to the discs and parallel to the side wall at the centre of the vessel.

Alternatively, the plurality of discs are aligned parallel to each other in a horizontally stacked arrangement, with the mixture flowing along the reactor vessel through the discs, and the discs are moved back and forth at the first frequency and the first amplitude. In this way, the reactor vessel is horizontally arranged. The discs may be considered as lying perpendicular to side walls of the reactor vessel, each on a vertical plane. Preferably the reactor vessel is cylindrical to provide a cylindrical side wall. More preferably, the one or more supports is a single post aligned perpendicularly to the discs and parallel to the side wall at the centre of the vessel.

In the description that follows, the drawings are not necessarily to scale. Certain features of the invention may be shown exaggerated in scale or in somewhat schematic form, and some details of conventional elements may not be shown in the interest of clarity and conciseness. It is to be fully recognized that individual features the embodiments discussed below may be employed separately or in any suitable combination to produce the desired results.

Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

All numerical values in this disclosure are understood as being modified by "about". All singular forms of elements, or any other components described herein including (without limitations) components of the apparatus are understood to include plural forms thereof.

Embodiments of the present invention will now be described, by way of example only, with reference to the following drawings of which:

Figure 1:
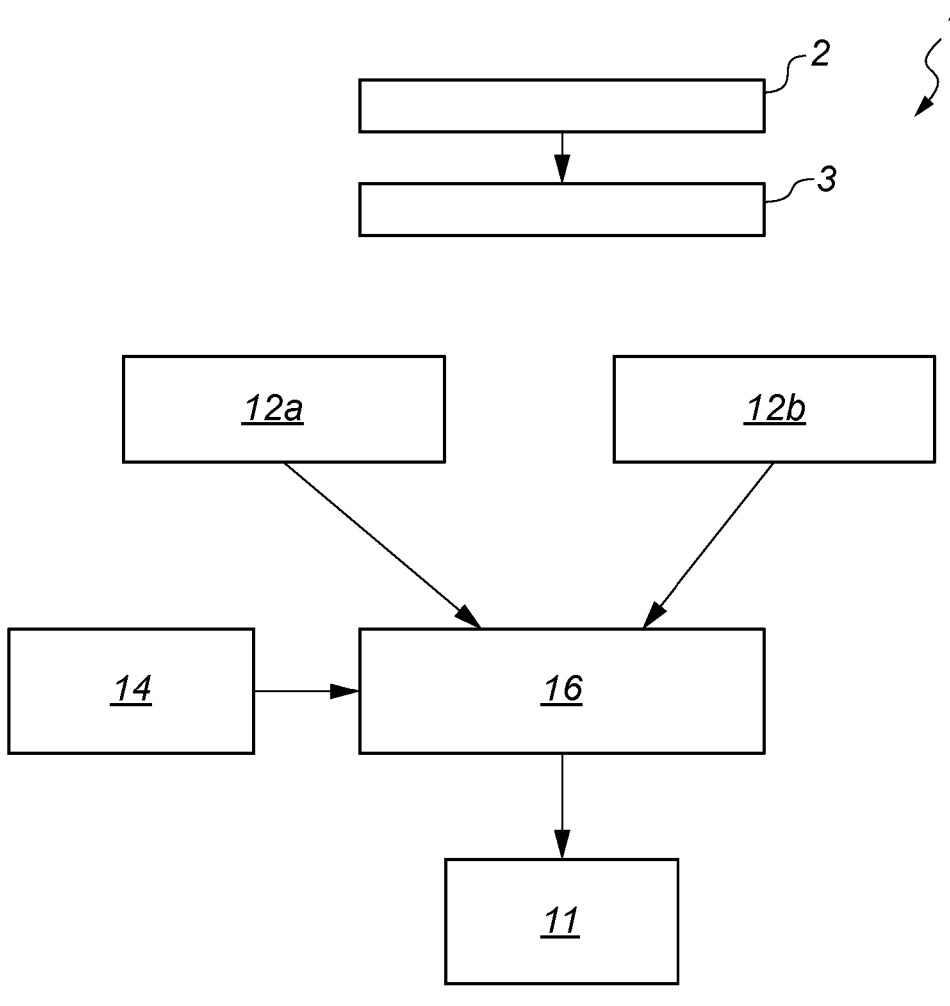
FIG. 1 is a flow chart illustrating the steps in a method of purifying reclaimed polymers according to an embodiment of the present invention.

Reference is initially made to FIG. 1 of the drawings which illustrates a method of purifying reclaimed polymers, generally indicated by reference numeral 1, according to an embodiment of the present invention. In the method 1 of purifying reclaimed polymers, the first step is to determine the desired property 2 that you wish the purified reclaim polymer to have. As an example, if targeting polyethylene there may be an ultimate desired requirement for a density of 954 kg/m$^3$. Thus a density of 954 kg/m$^3$ may be considered as the desired property 2 and a parameter value of 954 kg/m$^3$ may be the first parameter value 3 which gives the desired property 2. The reclaimed polymer feedstock 12a, in this example, being a polyethylene feedstock may have a density of 952 kg/m$^3$. By identifying a feedstock 12b nominally of a 956 kg/m$^3$ density and then adding a 50/50 mix of the feedstocks 12,12a i.e. 50% of 952 kg/m$^3$ density and 50% of 956 kg/m$^3$ density, then a 954 kg/m$^3$ density is equated, being the first parameter value 3. The feedstocks 12a,b are mixed in their equated portions 50/50 and dissolved in a solvent 14 giving a polymer solution 16. A purer polymer is separated from the polymer solution 16, the purer polymer being the purified reclaimed polymer 11 with the desired property 2. In our example, this is polyethylene with a density of 954 kg/m$^3$.

This technique can also be used to modify any other property e.g. melt index in the same way. Any number of feedstocks in any number of proportions can be used to create the desired properties. Thus, by monitoring the properties of the feedstocks, selecting the ones to be used and then mixing them in a desired ratio the resulting product at the end of the process can be designed to have the specific properties required. It will be recognised that physical and mechanical properties such as strength, stiffness, stress and impact resistance can be defined by the parameters of density and/or molecular weight.

Figure 2:
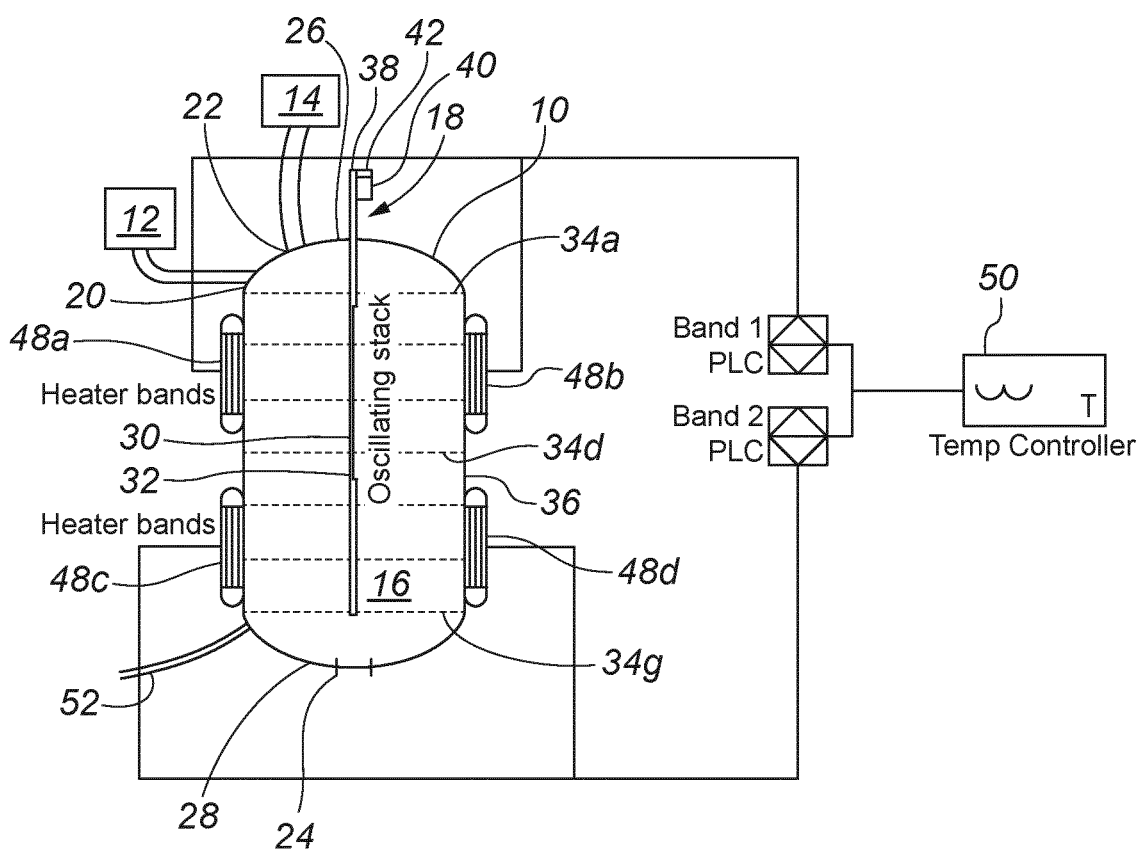
FIG. 2 is an illustration of a reactor vessel including a mixing device for use in the method according to an embodiment of the present invention.

In order to achieve the successful mixing of the reclaimed polymer feedstocks with differing parameter values, the invention advantageously uses a reactor vessel to dissolve the polymers in a solvent. Reference is now made to FIG. 2 of the drawings which illustrates a reactor vessel, generally indicated by reference numeral 10, for dissolving at a plurality of polymer feedstocks 12 in at least one solvent 14 in the method of purifying reclaimed polymers according to an embodiment of the present invention.

The reactor vessel 10 is substantially cylindrical having a height greater than its diameter. The capacity of the vessel 10 will be equal to or greater than 1,000 litres for commercial use. Those skilled in the art will recognise that a 2,000 to 3,000 litre vessel is practical, or a series of vessels. However, scaling to a 10,000 litre vessel can be done and even up to 30,000 litres. In this embodiment, there is a first input port 20 through which the solvent 14 and is introduced. While we will refer to the solvent 14, it will be understood that this may be a number of individual solvents which combine in the vessel 10. While the first input port is shown at the top of the vessel 10, it may be at any location on the vessel. A second input port 22 is provided for the combination of polymer feedstocks 12. The second input port 22 is more typically at the top of the vessel as the polymer feedstocks 12 will most likely be a solid material, such as recyclate flakes or film, while the solvent 14 will be a liquid. The polymer feedstocks 12 may be in the form of a melt stream if desired. Additionally, the polymer feedstocks 12 and solvent 14 could be mixed to form the mixture 16 before being introduced to the vessel 10. An output 24, shown towards the bottom of the vessel 10, is used to remove the dissolved polymer. The output 24 could be arranged at any position as the solution could be extracted throughout the height of the reactor vessel 10.

Within the vessel 10, there is a mixing device, generally indicated by reference numeral 18, vertically arranged in the centre of the vessel 10, and extending between the top 26 and bottom 28 of the vessel 10. Mixing device 18 has a central shaft 32 upon which is located a number of discs 34(a)-(g). For illustrative purposes only seven discs 34 are shown. The discs 34 are mounted perpendicularly to the shaft 32 so that they are aligned parallel to each other and each radiates out through the vessel 10 to almost reach the side wall 36. The number and position of the discs 34 may be varied on the shaft 32, but in the preferred embodiment they are equally spaced. The arrangement may be considered as a stack 30. Stack 30 is arranged vertically in the vessel 10.

The top 38 of shaft 32 is supported at the top 26 of the of the vessel 10 so that the mixing device 18 is suspended in the vessel 10. The shaft 32 is configured so that it may move up and down, moving longitudinally on its own central axis, vertically with respect to the vessel 10. The discs 34 are attached to the shaft 32 in such a way that they too, move up and down, longitudinally when the shaft 32 moves. Movement of the shaft 32, is achieved by use of an actuator linear movement motor 40 attached to the top end 38 of the shaft 32.

The motor 40 provides a linear movement to the shaft 32 on the central axis. The movement is a stroke, being a backward and forward motion, to extend the shaft 32 into the vessel 10 by a set distance, referred to as the amplitude. The frequency of the strokes can also be set, so that the shaft 32 acts like a piston, continuously moving the discs 34 up and down within the vessel 10. The movement of the discs 34 within the vessel 10 mixes the contents of the vessel 10, these being the mixture 16. This oscillation of the stack 30 can operate over a fixed time, it may be for short repeated pulses or can be stopped and started between checks to determine the dissolution of the vessel contents. Note that the stack 30, shaft 32 and discs 34 do not rotate so there is no stirring action.

Oscillation of the stack 30 is controlled by circuitry 42 which operates the motor 40 and determines the amplitude and frequency required to obtain optimum time for dissolution of polymer in the solvent. The amplitude and frequency determine the energy introduced to the mixture 16 as will be described hereinafter.

Figure 3:
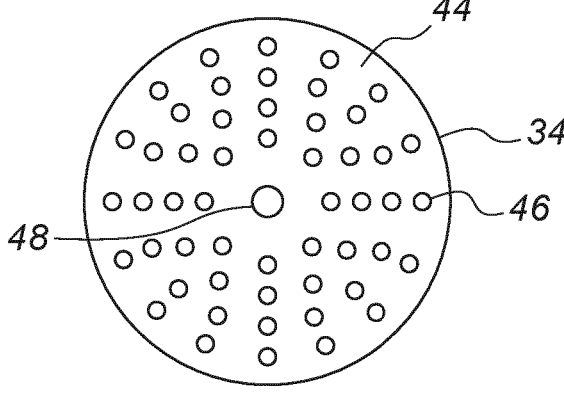
FIG. 3 is an illustration of a disc for use in the mixing device and reactor vessel of FIG. 1.

The vessel contents, being the mixture 16 of polymer feedstocks 12 and solvent 14, will be impacted by repeated contact with the discs 34. The discs 34 are designed to provide sufficient surface area 44 for contact with the vessel contents while still allowing the mixture 16 to move vertically through the entire length of the vessel 10 via perforations 46 through the discs 34. FIG. 3 shows an embodiment for a disc 34. Disc 34 is circumferential, with a central port 48 through which the shaft 32 is located and attached. A pattern of perforations 46 are arranged over the surface area 44 of the disc 34 creating multiple apertures through the disc 34. While the embodiment in FIG. 3 shows a regular pattern of perforations 46, they may be arranged randomly. There is also no requirement for perforations 46 to be aligned vertically between neighbouring discs when arranged in the vessel 10. Indeed it is better to mismatch the perforations 46 so that there are no pathways through the mixing device 18 which are parallel to the shaft 32.

The discs 34 are comparatively thin compared to the height of the vessel 10 and may be considered as plates, though as said previously, they are not rotated as would occur if a disc was an impeller as found in typical mixing tanks. Equally the discs 34 of the present invention are in direct contrast to known baffle structures used in mixing tanks. Prior art baffle structures are typically vertically arranged bars or rods spaced equidistantly around the outer edge of the tank which are fixed in position and do not move during operation of the tank.

Arranged around the vessel are heater bands 48a-d. While four heater bands 48a-d are shown arranged in an upper and lower configuration, any configuration of heating elements may be used to heat the vessel 10 and thereby heat the mixture 16. Sensors (not shown) can be used to determine the temperature of the mixture 16 and vessel 10, so that the temperature of the heater bands 48a-b can be adjusted to control the overall heating temperature and the temperature gradient across the vessel 10 via a temperature control unit 50.

There is also a gas line 52, used to introduce an inert gas such as nitrogen into the vessel 10. The nitrogen or other inert gas is purged into the system to displace oxygen with an inert atmosphere.

The method can also be used for the removal of additives in plastics such as colour pigments and odours, primarily for the re-use of consumer and industrial recyclable plastics. Initial sorting can be undertaken to provide an ideal pure polyolefin feedstock for the polymer feedstocks 12 input.

Plastic feedstocks may be: single source end of life thermoplastics i.e. wheelie bins all colour, containers, pipe, bottle caps, bottles and tanks; post-consumer and post-industrial recycled plastics; mixed PE/PP recyclate; films i.e. multilayer films, laminate films, PE or PP films; and other mixed thermoplastics: ABS, Polystyrene, PVC. Plastics can be sorted into individual materials, such as high-density polyethylene (HDPE) or poly(ethylene terephthalate) (PET), or mixed streams of other common plastics, such as polypropylene (PP), low-density polyethylene (LDPE), poly (vinyl chloride) (PVC), polystyrene (PS), polycarbonate (PC), and polyamides (PA). A mechanical separation step can then remove the ABS, polystyrene, PET and PVC. The preferred polymer feedstocks 12 is polyethylene (PE) and/or polypropylene (PP). Current recycling methods can produce a mixed PE/PP recyclate which provides the polyolefin in the form of flakes which can be easily weight and introduced to the reactor vessel 10 in measured quantities. In the examples given herein PE is the polymer feedstocks 12 in the forms of HDPE Roto moulding grade (green tank); HDPE Blow moulding grade; HDPE Extrusion grade (PE100—Pipe); LDPE; and LLDPE as would be recognised by those skilled in the art.

There are a large number of known solvents for use on polymers. A selected list from reference sources may include: 0-Dichloro benzene; 1,2,3,4-Tetrahydronaphthalene; 1,2-Dichloroethane; 1,4-Dioxane; 1,4-dioxane, acetone; Acetic acid; Acetic anhydride; Acetone; Acetonitrile; benzene; Benzyl alcohol; Bromobenzene; Butanone; butylglycol; Chloro benzene; Chloroform; Cyclohexane; Cyclohexanol; Cyclohexanone; Decahydronaphthalene; Dibutoxymethane; dibutyl ether; Dichlorobenzene; Dichloromethane; Diethyl ether; Diethylene glycol; Diisopropyl ether; Diisopropyl ketone; dimethyl formamide; dimethyl sulfoxide; Dimethyl sulfoxide; Dimethylformamide; Diphenyl ether; Ethanol; Ethyl acetate; Ethylbenzene; Ethylene carbonate; Ethylene glycol; Ethylglycol; Formamide; Formic acid; Glycerol; iso-Propanol; iso-Butanol; isopropanol; Kerosene; m-Cresol; Methanol; Methyl acetate; methyl ethyl ketone; Methyl isobutyl ketone; Methylcyclohexane; Methylene Chloride; Methyl-n-amyl ketone; N,N-Dimethyl acetamide; N,N-Dimethyl formamide; n-Butanol; n-Butyl acetate; n-Butyl chloride; n-Butyl ether; n-Decane; n-Heptane; n-hexane; n-Hexane; Nitro benzene; Nitroethane; Nitromethane; N-methylpyrrollidone; n-Propanol; Phenol; p-Xylene; Pyridine; 1,1,2,2-Tetrachloroethane; Tetrachloroethane; and tetrahydrofuran. In the example given, the solvent 14 is butylal though xylene, ethyl benzene and toluene are also preferred. While a single solvent 14 is used for the example, it will be recognised that for a mixture of applicable solvents can be used instead of a singular solvent for dissolution. Additionally, a two-phase system of solvents can be used to preferentially dissolve different polymer materials.

The solvent 14 is introduced to the vessel 10, through the input port 20. A measured amount of proportioned polymer feedstocks 12 is introduced to the vessel 10, through the input port 22. In the example, this is between 5 wt % and 30 wt %. The vessel 10 may be purged using an inert gas, such as nitrogen, to displace oxygen and create an inert atmosphere for the mixture 16. The mixing device 18 is operated to oscillate the discs 34 at a fixed frequency and amplitude. These values are between 1 and 15 Hz, and 40 to 1000 mm in our example. The linear motion causes dissolution of the PE in the solvent.

The process is assisted by heating the vessel 10 via the heater bands or heating elements 48. The temperature selected is below the solvent boiling point. Additionally, the temperature selected is below the polymer melting point, though an embodiment of the invention may be used wherein the polymer is introduced as a melt stream with the use of an amorphous polymer decreasing the dissolution time. In the example, the temperature is increased to above 120° C.

TABLE 1

| Dissolution Times in maximum polyethylene wt % addition in Butylal | | | | |
|---|---|---|---|---|
| | | Dissolution | | |
| PE | Wt % in Butylal | 50% PE (min) | 75% PE (min) | 100% PE (min) |
| HDPE Roto moulding grade (green tank) | 12 | 5 | 7 | 12 |
| HDPE Blow moulding grade | 15 | 5 | 7 | 12 |
| HDPE Extrusion grade (PE100 - Pipe) | 15 | 4 | 6 | 10 |
| LDPE | 30 | 2 | 6 | 8 |
| LLDPE | 30 | 2 | 6 | 8 |

Table 1 provides scaled predictions for a 10,000 litre reactor vessel, based on experimental results from a 500 ml reactor vessel with the worked example described hereinbefore. Thus the time duration for 100% dissolution is shown in all cases to be under 12 minutes. When compared to the prior art processes, which take hours, this reduction in dissolution time is a distinct advantage in commercial recycling plants. The process is also achieved without requiring the vessel to be placed under elevated pressures as for the prior art. However, it would be recognised by those skilled in the art that pressure could be applied to the vessel, say up to 5 atm (0.5 MPa), which will increase the internal temperature and therefore increase the solubility of the solvent and consequently further reduce the time duration.

Figures 4, 5:
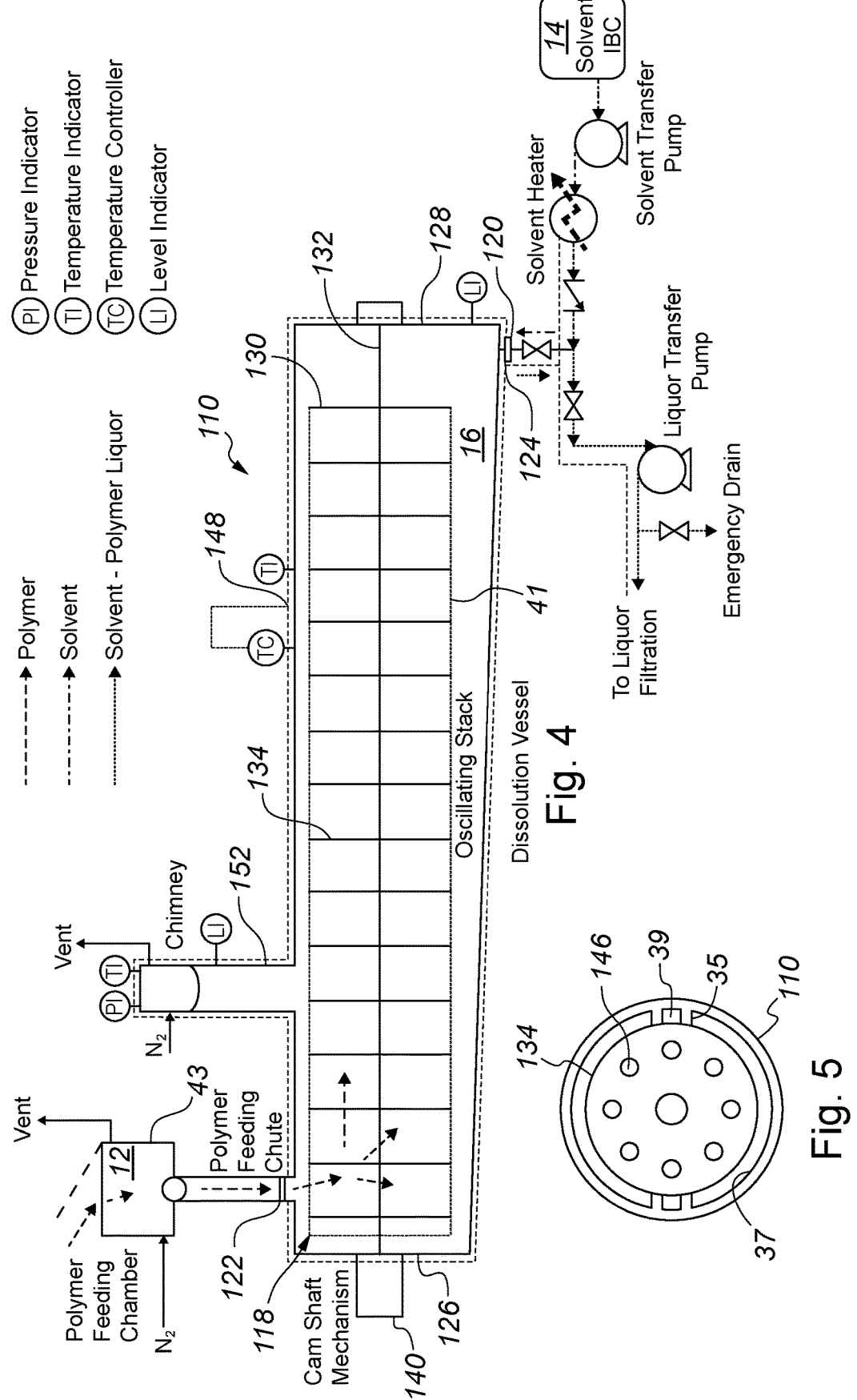
FIG. 4 is an illustration of a reactor vessel including an alternative mixing device for use in a method according to an embodiment of the present invention.
FIG. 5 is an illustration of a disc for use in the mixing device and reactor vessel of FIG. 4.

Reference is now made to FIG. 4 of the drawings which illustrates a alternative reactor vessel, generally indicated 110, for dissolving a plurality of polymer feedstocks 12 in at least one solvent 14 in a method of purifying reclaimed polymers according to an embodiment of the present invention. Like parts to the features of FIGS. 2 and 3 have been given the same reference numeral with the addition of 100, to aid clarity.

The primary difference between vessel 10 and vessel 110 is that vessel 110 is arranged horizontally as compared to the vertical arrangement of vessel 10. More particularly the discs 134 in the vessel 110 are provided in a horizontal stack 130.

Discs 134 are arranged in a horizontal stack 130 along the central shaft 132. While 16 discs 134 are shown this is illustrative and there may be any even or odd number of discs 134. The shaft 132 is supported at a first end 126 and a second end 128 by both end plates of the vessel 110. The reactor vessel 110 now has a length greater than its diameter. The discs 134 are as described for those with reference to FIG. 3, with the perforations 146 now allowing liquid to flow horizontally through them. It will be appreciated that the discs 134 might be mounted perpendicularly to the shaft 132 or at a slight angle. Due to the horizontal arrangement, guide rails 35 (see FIG. 5) on the internal walls 37 of the vessel 110 are provided to support the stack 130 and aid with sliding in and out the mixing device 118. Protrusions 39 on each an edge of a disc 134, slot into the guide rail 35 along length of vessel 110. The stack 130 and discs 134 are free to move back and forth within the guide rail 35.

As illustrated in FIG. 4, the vessel 110 need not be cylindrical but may be of any shape. The vessel 110 is advantageously shaped with a taper to provide a low point at which the output 124 is positioned. The output 124 could be arranged at any position as the solution could be extracted throughout the height of the reactor vessel 110. In FIG. 4, as the discs 134 do not extend to the internal walls 37, a mesh 41 with specific pore size is wrapped around the stack 130. The mesh is made of stainless steel, PTFE or other suitable material which will not chemically interfere with the polymer feedstocks 12 or solvent 14. The mesh 41 is a perforated sheath which contains undissolved solids but allows passage of solvent 14 and dissolved solvent polymer mixture 16.

The linear motion generator 140 is now located at one of the end plates 26,28 of the vessel 110, so that the mixing device 118 is moved back and forth to oscillate along the central shaft 132 on its own axis. As with the first embodiment, the shaft 132 is not turned and the guide rails 35 prevent any rotation of the discs 134.

Input 122 for the polymer feedstocks 12 has a polymer loading chamber 43. Chamber 43 allows a polymer feedstock to be purged, with nitrogen say, to remove oxygen in a sealed enclosure. The chamber 43 is kept a distance from the vessel 110 to ensure the temperature-controlled heating jacket 148 does not melt the contents of the chamber 43. The gas line 152 is provided in combination with a chimney. The gas line 152 is used to introduce an inert gas, preferably nitrogen to purge the vessel 110 and maintain pressure during draining, though the vessel 110 can be filled with liquid with no head space, or with a head space filled with an inert gas e.g nitrogen.

The input 120 for the solvent 14 is co-located with the output 124. This is preferably through a valve which may be a slide gate valve. The solvent 14 can be preheated before it is fed into the vessel 110, or it might be heated in the vessel 110. An operating temperature for the vessel 110 may in the range 80-140 degrees Celsius, although this could be raised to 200 degrees Celsius depending on solvent 14 used. An operating pressure will preferably be in range 0.1-1.5 bara, but it can be higher.

Following mixing, the dissolved polymer is removed at the output 124 and passed on for further processing. The method is as described hereinbefore with reference to vessel 10. The horizontal vessel 110 lends itself to be used as a series of vessels connected together to reduce the batch mixing size so that the temperature and pressure can be more efficiently maintained.

Features of the vessels 10,110 and mixing devices 18,118 between the embodiments shown in FIGS. 2, 3, 4 and 5 may be interchanged.

Any known technique can be used to separate the purer polymer 11 from the polymer solution 16. In the prior art described above, the polymer solution 16 is first purified further by contacting with a solid media at an elevated temperature and pressure. The solid media is selected from the group consisting of inorganic substances, carbon-based substances, or mixtures thereof. Useful examples of inorganic substances include oxides of silicon, oxides of aluminium, oxides of iron, aluminium silicates, magnesium silicates, amorphous volcanic glasses, silica, silica gel, diatomite, sand, quartz, reclaimed glass, alumina, perlite, fuller's earth, bentonite, and mixtures thereof. Useful examples of carbon-based substances include anthracite coal, carbon black, coke, activated carbon, cellulose, and mixtures thereof. In another embodiment the solid media is recycled glass. It will be realised that this step can be undertaken at lower temperatures and pressures by using the vessels 10,110 as described hereinbefore. Filtration can then be used to remove much of the additives. The purer polymer 11 can then be separated by from the solution by precipitation and/or distillation. This can be achieved by varying the temperature and/or pressure as is known in the art. The purer polymer 11 can be extruded to form plastic pellets of a high grade with the desired property 2.

The principle advantage of the present invention is that it provides a method of purifying reclaimed polymers by which feedstocks can be selectively chosen to be added to the dissolution process in order to create a designated grade. There are an infinite number of combinations for the feedstock and it can be used for any recyclable plastic stream. The key advantages of are:

a method of varying product density in polyethylene by adding different proportions of both high and low density polyethylene feedstocks.

a method of varying product M. Wt by adding different proportions of feedstock with varying mol. wt.

a method of varying product Environmental stress crack resistance by adding different proportions of high/low mol. wt feedstocks.

a method of varying the product mechanical properties in order to vary, mechanical strength, stiffness and impact resistance by adding feedstocks of different density or mol wt.

a method to tailor product processability by adding different proportions of high/low mol wt feedstocks and so create the mol wt distribution required for particular applications.

a method to control the final product within set parameters and so produce a grade with improved consistency.

It will be appreciated by those skilled in the art that modifications may be made to the invention herein described without departing from the scope thereof. For example, other chemicals can be added to the mixture in the vessel such as an antioxidant to prevent degradation.

We claim:

1. A method of purifying reclaimed polymers, comprising the steps:

(a) selecting a desired value of a first property of the purified reclaimed polymer;

(b) determining a first value of a second property of reclaimed polymer feedstock which will provide the desired value of the first property in the purified reclaimed polymer;

(c) selecting at least two reclaimed polymer feedstocks, each with a different value of the second property and determining quantities of each of the reclaimed polymer feedstocks which, when combined, will provide a reclaimed polymer feedstock having the first value of the second property;

(d) dissolving the quantities of the at least two reclaimed polymer feedstocks in at least one solvent to combine the at least two reclaimed polymer feedstocks and produce a polymer solution; and (e) separating a purer polymer from the polymer solution, the purer polymer being the purified reclaimed polymer with the first value of the second property and hence the desired value of the first property.

2. A method of purifying reclaimed polymers according to claim 1 wherein the second property is selected from a group comprising: density and molecular weight.

3. A method of purifying reclaimed polymers according to claim 1 wherein the first property is selected from a group comprising: density, molecular weight, environmental stress resistance, strength resistance, stiffness resistance and impact resistance.

4. A method of purifying reclaimed polymers according to claim 1 wherein step (d) comprises the steps:

(i) introducing the plurality of reclaimed polymer feedstocks to the at least one solvent in a reactor vessel to create a mixture;

(ii) operating a mixing device within the reactor vessel for a first time duration;

characterised in that, the mixing device comprises: a plurality of discs aligned parallel to each other in a stacked arrangement; each disc extending over a majority of the cross-sectional area of the reactor vessel and including a plurality of perforations to allow the mixture to flow from a first end of the reactor vessel to a second end of the reactor vessel, through the discs; one or more supports to hold the discs in position; and the one or more supports connected to a linear motion generator so that the discs are moved to oscillate at a first frequency and first amplitude, the linear motion dissolving at least a portion of polymer in the solvent in the first time duration.

5. A method according to claim 4 wherein the first time duration is selected from a group consisting of time intervals of: less than 60 minutes, less than 30 minutes, and less than 15 minutes.

6. A method of purifying reclaimed polymers according to claim 1 wherein the plurality of polymer feedstocks is in the range of 0.1% to 30% wt addition to the at least one solvent so that the weight of the polymer feedstocks is 0.1% to 30% of the weight of the solvents.

7. A method according to claim 6 wherein the plurality of polymer feedstocks is in the range of 0.3% to 10% wt addition to the at least one solvent.

8. A method of purifying reclaimed polymers according to claim 1 wherein the reactor vessel has a volume of 1,000 litres or greater.

9. A method of purifying reclaimed polymers according to claim 1 wherein the first frequency is in the range 1 to 15 Hz.

10. A method of purifying reclaimed polymers according to claim 1 wherein the first amplitude is in the range 40 to 1000 mm.

11. A method of purifying reclaimed polymers according to claim 1 wherein the method includes heating the mixture to a first temperature, the first temperature being between room temperature and the at least one solvent boiling point.

12. A method according to claim 11 wherein the mixture is heated by heating the reactor vessel.

13. A method according to claim 11 wherein the first temperature is in the range of 800 C to 1200.

14. A method according to claim 11 wherein the first temperature is above 1200 C.

15. A method of purifying reclaimed polymers according to claim 1 wherein the plurality of polymer feedstocks is one or more polyolefins.

16. A method according to claim 15 wherein the plurality of polymer feedstocks is polyethylene (PE).

17. A method according to claim 15 wherein the plurality of polymer feedstocks is polypropylene (PP).

18. A method of purifying reclaimed polymers according to claim 1 wherein the at least one solvent is selected from a group comprising: butylal, xylene, ethyl benzene and toluene.

19. A method of purifying reclaimed polymers according to claim 1 wherein the plurality of discs are aligned parallel to each other in a vertical stack, with the mixture flowing vertically in the reactor vessel through the discs, and the discs are moved up and down at the first frequency and the first amplitude.

20. A method according claim 1 wherein the plurality of discs are aligned parallel to each other in a horizontally stacked arrangement, with the mixture flowing along the reactor vessel through the discs, and the discs are moved back and forth at the first frequency and the first amplitude.

* * * * *